(12) United States Patent
Bennett

(10) Patent No.: US 11,358,656 B2
(45) Date of Patent: Jun. 14, 2022

(54) CARGO TRAILER WITH TENSIONED WALL PANELS AND PROCESS OF MANUFACTURE

(71) Applicant: UTILITY TRAILER MANUFACTURING COMPANY, City of Industry, CA (US)

(72) Inventor: Jeffrey J. Bennett, South Pasadena, CA (US)

(73) Assignee: Utility Trailer Manufacturing Company, City of Industry, CA (US)

( * ) Notice: Subject to any disclaimer, the term of this patent is extended or adjusted under 35 U.S.C. 154(b) by 467 days.

(21) Appl. No.: 16/683,729

(22) Filed: Nov. 14, 2019

(65) Prior Publication Data
US 2021/0147008 A1    May 20, 2021

(51) Int. Cl.
*B62D 33/04* (2006.01)
(52) U.S. Cl.
CPC .................................. *B62D 33/044* (2013.01)
(58) Field of Classification Search
CPC ...................................................... B62D 33/04
USPC .............. 296/182.1, 186.1; 280/789; 52/479
See application file for complete search history.

(56) References Cited

U.S. PATENT DOCUMENTS

| | | | | |
|---|---|---|---|---|
| 4,810,027 A * | 3/1989 | Ehrlich | ........... | B62D 33/04 52/461 |
| 5,112,099 A * | 5/1992 | Yurgevich | ........... | B62D 33/04 52/464 |
| 6,003,932 A * | 12/1999 | Banerjea | ........... | B62D 33/04 52/464 |
| 6,010,020 A * | 1/2000 | Abal | ........... | B62D 33/04 296/186.1 |
| 6,832,808 B1 * | 12/2004 | Bennett | ........... | B62D 33/04 296/186.1 |
| 6,959,959 B1 * | 11/2005 | Roush | ........... | B62D 33/046 296/186.1 |
| 2003/0071486 A1 * | 4/2003 | Graaff | ........... | B60R 13/0206 296/186.1 |
| 2011/0169301 A1 * | 7/2011 | Schmidt | ........... | B62D 33/046 296/185.1 |
| 2013/0224419 A1 * | 8/2013 | Lee | ........... | B62D 33/044 428/161 |
| 2016/0039476 A1 * | 2/2016 | Kunkel | ........... | B62D 33/046 296/186.1 |

\* cited by examiner

*Primary Examiner* — Hilary L Gutman

(57) ABSTRACT

A cargo trailer wall structure of panels includes adjacent outer sheets, posts spaced along one side of the outer sheets and fasteners therebetween. The posts are formed into central webs and attachment ribs to either side of the central webs. The attachment ribs have concave surfaces abutting against the outer sheets and rows of holes matching rows of holes in the outer sheets. The elongate concave surfaces are aligned with the rows of holes of the attachment ribs. The fasteners draw the sheets and posts together and distort the outer sheets into contact against the concave surfaces.

8 Claims, 3 Drawing Sheets

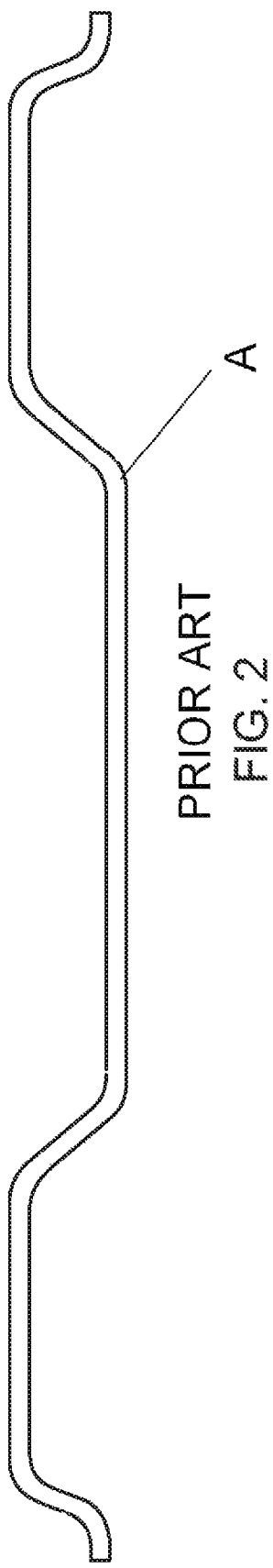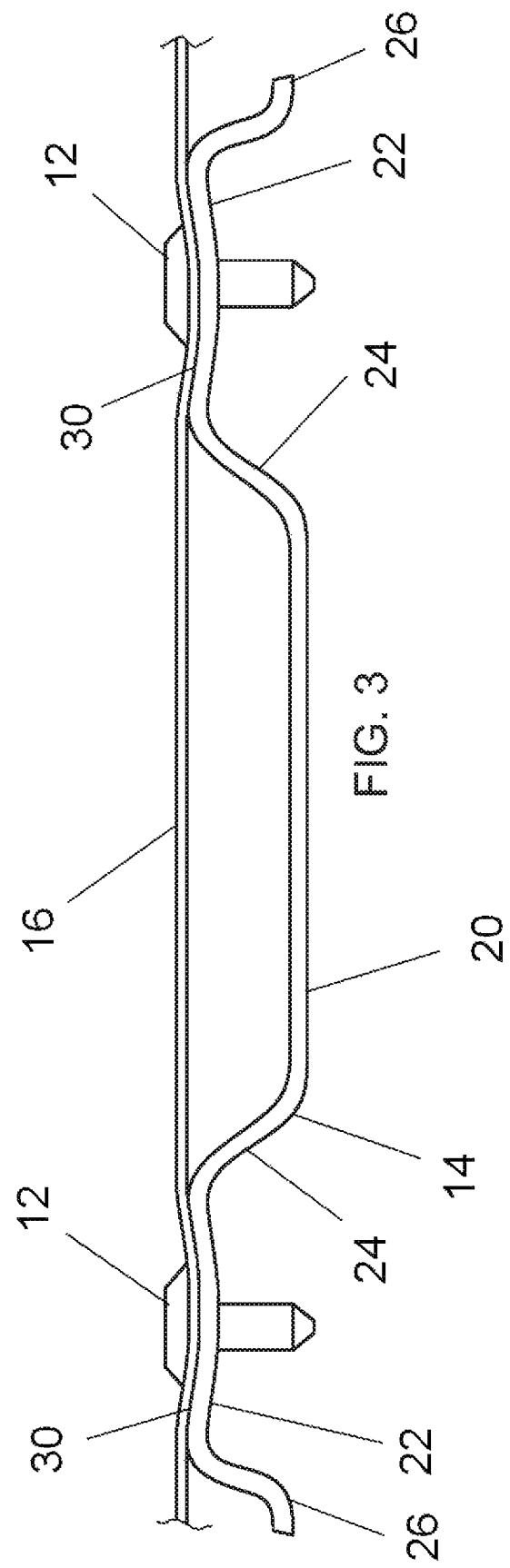

CARGO TRAILER WITH TENSIONED WALL PANELS AND PROCESS OF MANUFACTURE

BACKGROUND OF THE INVENTION

The field of the present invention is cargo trailers.

There are many cargo trailers that typically utilize flat rectangular panels placed adjacent to each other to form the side walls of the trailers, such as those disclosed in U.S. Pat. Nos. 6,652,019 and 6,832,808. The disclosures of these patents are each incorporated herein by reference in their entirety. The panels disclosed in these patents contain adjacent rectangular panel sheets with posts spaced along the panel sheets including spanning across adjacent panel sheets to join the panels together, typically using rivets. FIG. 2 illustrates a current standard trailer sidewall posts A. The posts are formed to provide column strength to the structure with minimal intrusion into the cargo area.

With refrigerated trailers, polyurethane insulation is conventionally injected under pressure into the spaces between the panel sheets and the posts. This causes the panel sheets to bulge between rivets, detracting from the esthetics of the flat panels but tensioning the panels at the same time. This tensioning of the panels has been found to add to the structural characteristics of the panels.

SUMMARY OF THE INVENTION

The present invention is directed to tensioning the panel sheets on cargo trailers and the resulting enhanced structures. Formed posts include attachment ribs to either side of a web. The ribs include elongate concave surfaces with rows of holes aligned on these surfaces. The surfaces are positioned against the panel sheets that have corresponding rows of holes; and the sheets and posts are tightly fastened together. The modulus of elasticity of the sheets in tension is exceeded by the modulus of elasticity of the posts between rows of holes. The fastening thus results in the panel sheets being drawn into the concave surfaces and tensioned.

Accordingly, it is a principal object of the present invention to provide structurally enhanced wall panels for cargo trailers. Other and further the substances and advantages will appear hereinafter.

BRIEF DESCRIPTION OF THE DRAWINGS

FIG. 2 is an end view of a prior art post;
FIG. 3 is an end of a post with concave surfaces and an associated panel sheet.

DETAILED DESCRIPTION OF THE PREFERRED EMBODIMENTS

Figure 1:
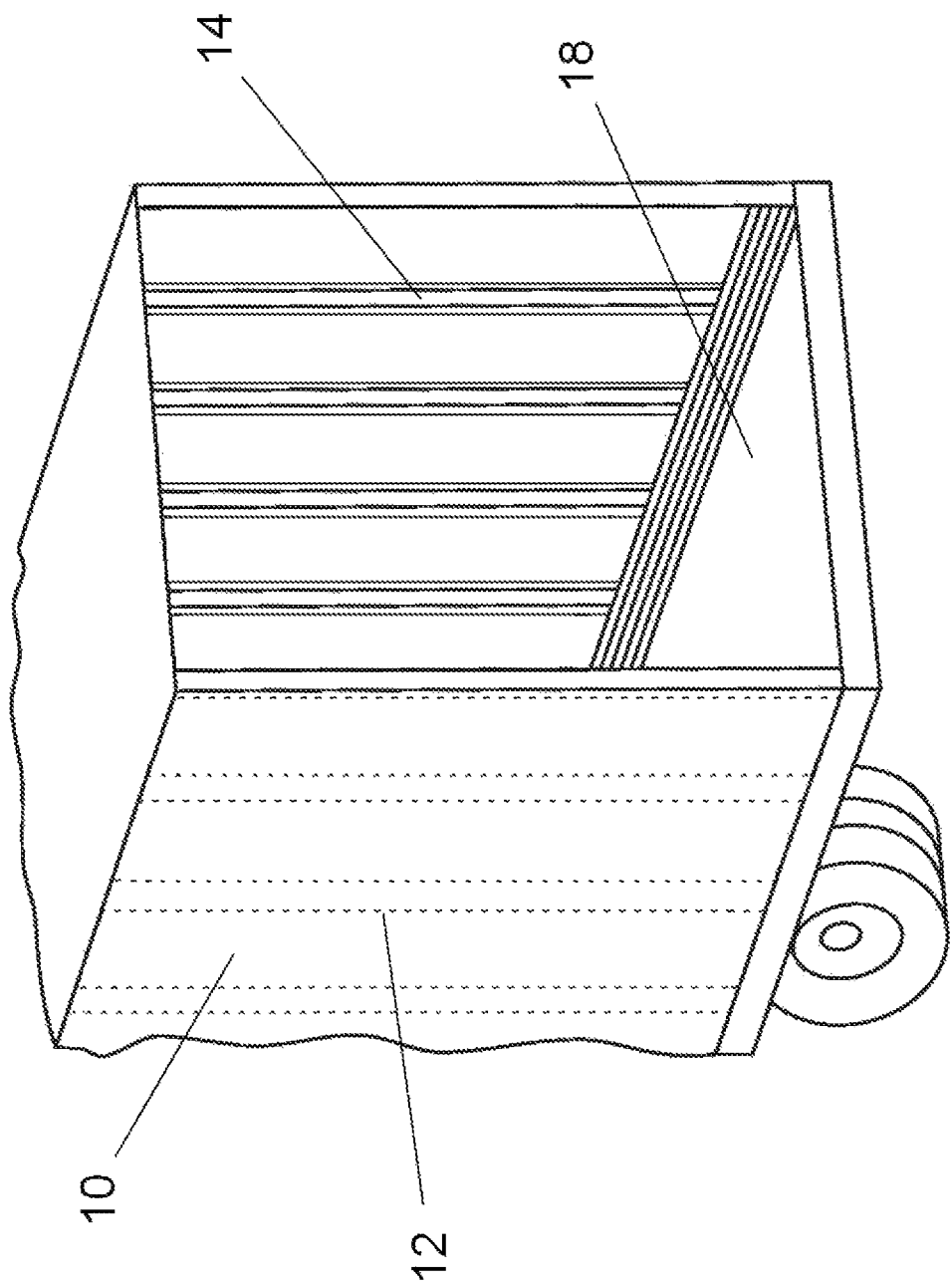
FIG. 1 is an isometric view of a cargo trailer.
Figure 4:
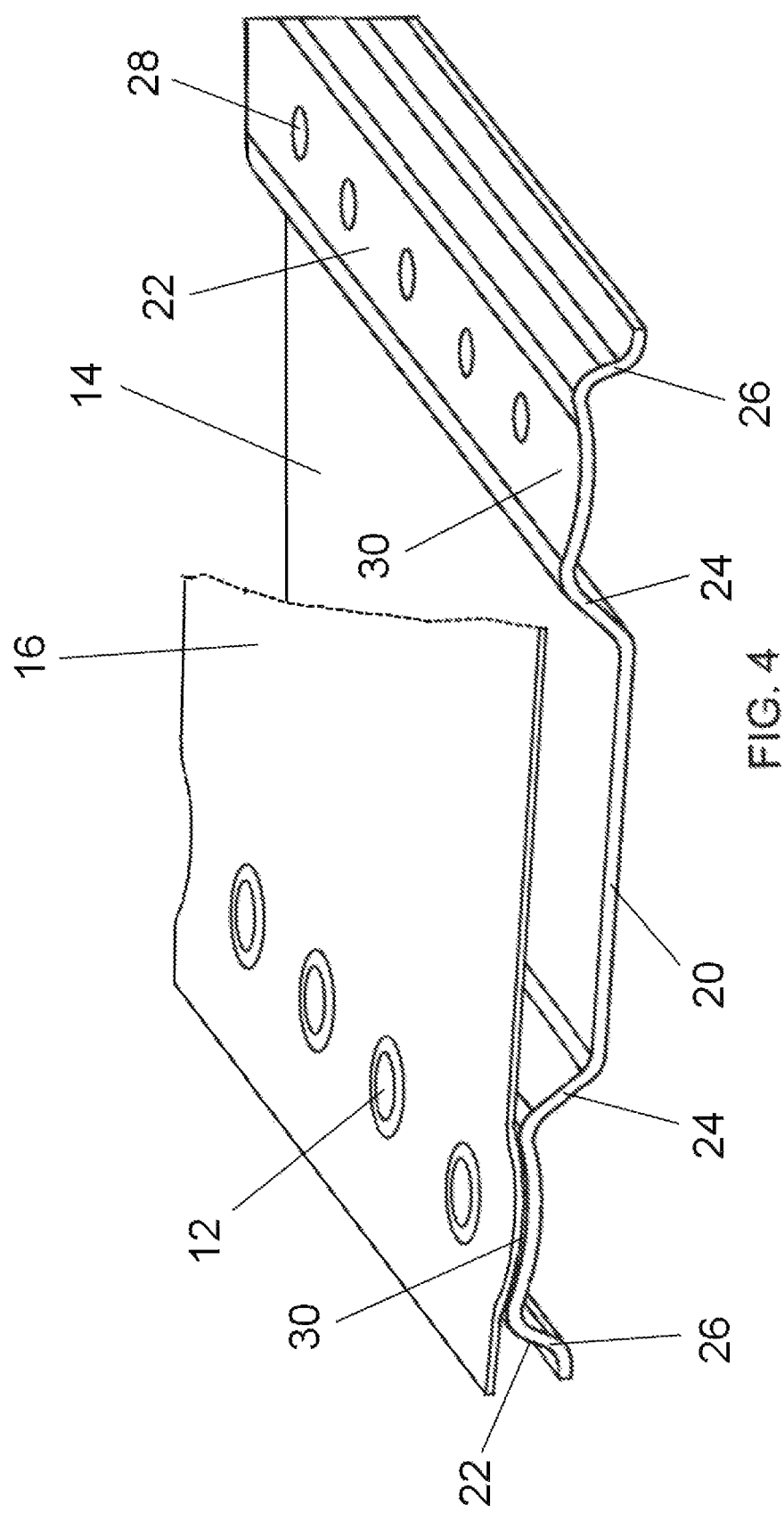
FIG. 4 is an isometric view showing a detail of portions of a post assembled with a panel sheet and fasteners.

The preferred embodiment of the present invention will now be described with reference to the drawings. To facilitate the description, a reference numeral representing an element in one figure will represent the same element in any other figure.

A cargo trailer is illustrated in FIG. 1 having side panels 10 showing rivets 12 in spaced vertical rows. On the inside of the trailer, posts 14 are shown spaced along one side of outer sheets 16 to make up the panels 10. The panels 10 are arranged adjacent to one another on the trailer bed 18 to construct the sidewalls of the cargo trailer. The posts 14 also span to adjacent panels 10 to create an integral trailer sidewall. The formed post plates 14 and outer sheets 16 may be the same or dissimilar material, commonly steel or aluminum is used.

The posts 14 include a central web 20 shown to be flat in the preferred embodiment. Attachment ribs 22 are located to either side of the web 20. Inclined transition walls 24 extend from the web 20 to the attachment ribs 22. Thus, the attachment ribs 22 extend forwardly of the central webs 20 to encounter the outer sheets 16. Curved flanges 26 are outwardly of the attachment ribs 22 to further rigidify the posts 14. The posts 14 include spaced vertical rows of holes 28 in the attachment ribs 22. The outer sheets 16 also include spaced vertical rows of holes matching the pattern of holes 28 for receipt of fasteners 12.

The attachment ribs 22 include elongate concave surfaces 30 running lengthwise on the posts 14. The concave surfaces 30 are aligned with the rows of holes 28. The posts 14 defined by the contours seen in cross section, including the webs 20, the ribs 22, transition walls 24, the flanges 26 and the concave surfaces 30, may be formed by fabrication, roll forming, extrusion or other metal working techniques. The holes 28 in the attachment ribs 22 of the posts 14 as well as the holes in the outer sheets 16 may be drilled, punched or otherwise formed in the components.

The side panels 10 are assembled and the trailer sidewall completed by locating the posts 14 spaced along one side of the outer sheets 16. The attachment ribs 22 abut against the one side of the outer sheets 16 with the elongate concave surfaces 30 positioned against the outer sheets 16. The rows of holes 28 of the attachment ribs 22 are aligned with the rows of holes of the outer sheets 16. The fasteners 12 can then be placed in the holes in the outer sheets 16 aligned with the holes 28 in the posts 14.

The posts 14 have a greater modulus of elasticity between rows of holes 28 than the modulus of elasticity in tension of the sheets 16. This may be achieved by the outer sheets 16 being substantially thinner than the plate thickness of the formed posts 14. This allows the flat outer sheets 16 to be drawn into the concave surfaces 30 without significant deformation of the posts 14 at the attachment ribs 22. The fasteners 12 are employed to draw the flat outer sheets 16 into the concavities defined by the concave surfaces 30. The standard fasteners employed in cargo trailer construction are rivets. The process of completing rivets includes forcing together the components to be fastened. In this, the outer sheets 16 are drawn into concavities as the panels 10 are assembled. Other fasteners such as bolts with nuts can also work. As the surfaces across the concavities are longer than a flat path over the concavity, the outer sheets 16 are pulled into the concavities as they are depressed by the fasteners 12 and are consequently tensioned. Concave segments having a depth of 0.040 in and a width of just under one inch provide appropriate tension to the outer sheets 16.

Thus, an improved cargo trailer wall structure is here disclosed. While an embodiment and applications of this invention have been shown and described, it would be apparent to those skilled in the art that modifications are possible without departing from the inventive concepts herein. The invention, therefore, is not to be restricted except in the spirit of the appended claims.

What is claimed is:

1. A cargo trailer having thin walls comprising:
   a plurality of adjacent outer sheets including spaced vertical rows of holes;
   a plurality of posts spaced along one side of the outer sheets including contours in cross section having central webs and attachment ribs to either side of the central webs, the attachment ribs having rows of holes matching the rows of holes in the outer sheets and elongate concave surfaces aligned with the rows of holes of the attachment ribs, the elongate concave surfaces being positioned against the one side of the outer sheets, the posts having a greater modulus of elasticity between the rows of holes in the attachment ribs than the modulus of elasticity in tension of outer sheets; and fasteners passing through the holes in the outer sheets and the attachment ribs and tightly connecting the outer sheets and the posts, the outer sheets being distorted into contact against the concave surfaces.

2. The cargo trailer of claim 1, the attachment ribs having inclined transition walls extending from the webs to the concave surfaces.

3. The cargo trailer of claim 2, the contours of the plurality of posts further having curved rigidifying flanges outwardly of the attachment ribs.

4. The cargo trailer of claim 1, the webs being planar.

5. The cargo trailer of claim 1, the outer sheets and the posts being of the same material, the posts having a wall thickness greater than the outer sheets.

6. The cargo trailer of claim 1, the fasteners being rivets.

7. A process for forming thin cargo trailer walls including a plurality of adjacent outer sheets having spaced vertical rows of holes, a plurality of posts having rows of holes matching the rows of holes in the outer sheets and fasteners, the posts having a greater modulus of elasticity than the outer sheets and including contours in cross section having central webs and attachment ribs to either side of the central webs, comprising the steps of forming elongate concave surfaces on the attachment ribs aligned with the rows of holes of the posts;

locating the posts spaced along one side of the outer sheets including abutting the attachment ribs against the one side of the outer sheets with the elongate concave surfaces positioned against the outer sheets and aligning the rows of holes of the posts with the rows of holes of the outer sheets;

drawing the outer sheets tight against the concave surfaces and retaining by the fasteners.

8. The process of claim 7, the fasteners being rivets.

* * * * *